United States Patent [19]

Inomata et al.

[11] Patent Number: 5,118,775
[45] Date of Patent: Jun. 2, 1992

[54] FLUOROORGANOPOLYSILOXANE AND A PROCESS FOR PREPARING THE SAME

[75] Inventors: Hiroshi Inomata, Takasaki, Japan; Yasuo Tarumi, Iowa City, Iowa

[73] Assignee: Shin-Etsu Chemical Co., Ltd., Tokyo, Japan

[21] Appl. No.: 481,208

[22] Filed: Feb. 20, 1990

[30] Foreign Application Priority Data

Feb. 21, 1989 [JP] Japan .................................. 1-40960

[51] Int. Cl.$^5$ .............................................. C08G 77/06
[52] U.S. Cl. ........................................ 528/12; 528/21; 528/23; 528/37; 528/42
[58] Field of Search .................. 528/37, 42, 21, 23, 528/12

[56] References Cited

U.S. PATENT DOCUMENTS

| | | | |
|---|---|---|---|
| 3,809,783 | 5/1974 | Pittman et al. | 528/42 |
| 4,549,004 | 10/1985 | von Au et al. | 528/42 |
| 4,985,526 | 1/1991 | Kishita et al. | 528/42 |

FOREIGN PATENT DOCUMENTS

| | | |
|---|---|---|
| 0252652 | 1/1988 | European Pat. Off. |
| 0255957 | 2/1988 | European Pat. Off. |
| 0311262 | 4/1989 | European Pat. Off. |
| 2065153 | 6/1981 | United Kingdom |

OTHER PUBLICATIONS

Patent Abstracts of Japan, vol. 11, No. 236, Aug. 4, 1987.

Primary Examiner—Melvyn I. Marquis
Attorney, Agent, or Firm—Oblon, Spivak, McClelland, Maier & Neustadt

[57] ABSTRACT

A fluoroorganopolysiloxane having the following general unit formula (I):

$$(R^1OR^2)_a(R^3)_b(OH)_c Si_{\frac{4-a-b-c}{2}} \quad (I)$$

wherein $R^1$ represents a fluorine-containing organic group represented by the following formula:

$$F-(-C_gF_{2g}O-)_d-C_hF_{2h}CH_2-$$

where
d represents an integer of from 1 to 5, g represents an integer of from 1 to 3, and h is an integer of 1 or 2,
$R^2$ represents a divalent hydrocarbon group containing no fluorine atom,
$R^3$ represents a hydrocarbon group containing no fluorine atom,
a is a number of from 0.001 to 0.34,
b is a number of from 1.64 to 2.34,
c is a number of from 0 to 0.67, and a+b+c ranges from 1.90 to 2.67,
and having a viscosity of not less than $1 \times 10^6$ at 25° C., and a process for preparing the same. This polymer is useful as a raw material of heat-vulcaization type fluorosilicone rubber.

13 Claims, 4 Drawing Sheets

Elution time →

Elution time →

FLUOROORGANOPOLYSILOXANE AND A PROCESS FOR PREPARING THE SAME

BACKGROUND OF INVENTION

1. Field of the Invention

The present invention relates to a novel fluoroorganopolysiloxane and a process for preparing the same.

2. Description of the Prior art

Organopolysiloxanes have low surface tension and low refractive indexes, and are excellent in properties such as heat resistance, cold resistance, electrical insulation properties, water repellency, release properties, defoaming properties and chemical resistance; hence they are nowadays used in extensive industries. However, the recent progress of technology requires development of organopolysiloxanes excellent in various properties capable of satisfying high level of requirements. In attempt to satisfying the requirements, for example, organopolysiloxanes having a fluorine-containing organic group were proposed, and several process for preparing them were proposed (Japanese pre-examination patent publication Nos. 47605/1987, 47608/1987, 49305/1987, 529/1988, 27530/1988, and 41530/1988).

In preparing heat-vulcanization type silicone rubber compounds, an organopolysiloxane having a large polymerization degree with a viscosity of $1 \times 10^6$ cP or more is essential as a main ingredient, because an organopolysiloxane with a lower polymerization degree is liable to adhere to rolls when worked with a roll mill and worsen workability extremely, and because resulting compounds produce only cured products with poor mechanical properties such as strength and elongation. Fluorosilicone rubbers have good heat resistance, oil resistance, release properties, etc., and require a fluorine-containing organopolysiloxane with a large polymerization degree as a raw material. The present invention provides a novel fluoroorganopolysiloxane containing a perfluoroalkylether group and having a sufficiently large polymerization degree, which can be used as a raw material as described above.

As a process of preparing such a high molecular weight fluoroorganopolysiloxane containing a perfluoroalkylether group, a process may be proposed in which a cyclotrisiloxane having the perfluoroalkylether group is synthesized, and then polymerized according to a known process, i.e., it is polymerized in the presence of such a catalyst as silanolates of alkali, e.g., Li, Na, K and Cs at 100° to 180° C. It has been found, however, that according to this process, depolymerization also occur, thereby producing a polymer containing a considerable amount of low molecular weight compounds; hence it is impossible to produce the desired polymer with a large polymerization degree in a good yield.

SUMMARY OF THE INVENTION

Accordingly, an object of the present invention is to provide a novel fluoroorganopolysiloxane having a perfluoroalkylether group, with a large polymerization degree which can satisfy some of recent requirements to raw materials for high-level functional materials, and a process for preparing it.

The present invention provides a novel fluoroorganopolysiloxane having the following general unit formula (I):

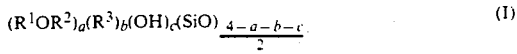

wherein $R^1$ represents a fluorine-containing organic group represented by the following formula:

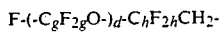

where d represents an integer of from 1 to 5, g represents an integer of from 1 to 3, and h is 1 or 2, $R^2$ represents a divalent substituted or unsubstituted hydrocarbon group having 3 to 10 carbon atoms and containing no fluorine atom, $R^3$ represents a substituted or unsubstituted hydrocarbon group containing 1 to 10 carbon atoms and containing no fluorine atom, a is a number of from 0.001 to 0.34, b is a number of from 1.64 to 2.34, c is a number of from 0 to 0.67, and a+b+c ranges from 1.90 to 2.67, and having a viscosity of not less than $1 \times 10^6$ cP at 25° C.

The fluoroorganopolysiloxane containing a perfluoroalkylether group in the molecule and having a large polymerization degree of the present invention, is useful as a main ingredient of heat-vulcanization type fluorosilicone rubber composition. The cured fluorosilicone rubber obtained is excellent in oil resistance, surface release properties, etc.; hence it is useful as a material for members or parts requiring oil resistance and gasoline resistance used in, e.g., automobiles or aircraft, and members requiring surface release properties such as PPC rolls. This fluoroorganopolysiloxane can be produced by a process described later.

DETAILED DESCRIPTION OF PREFERRED EMBODIMENTS

Fluoroorganopolysiloxane

Figure 1:
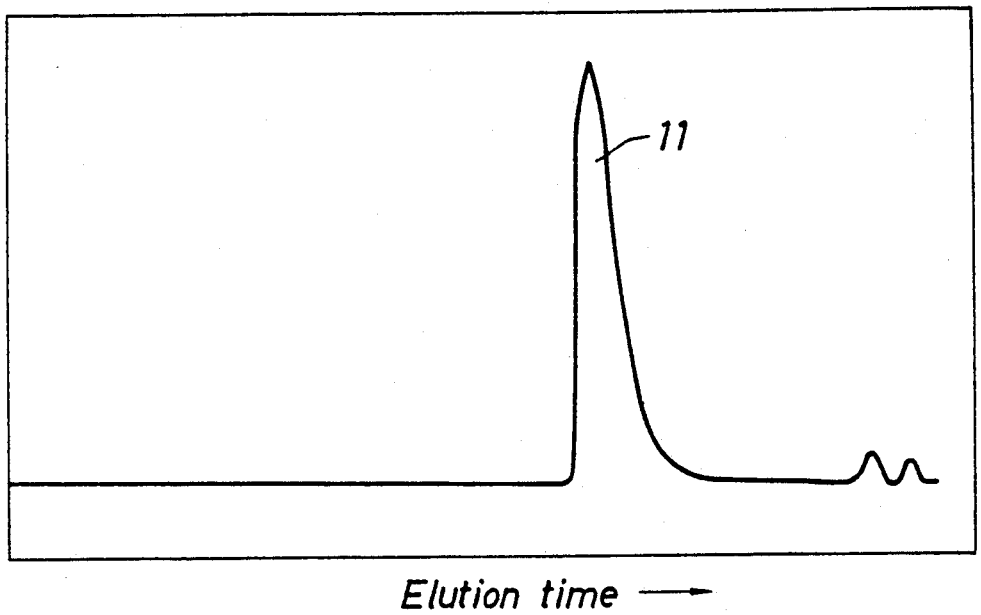
FIG. 1 and FIG. 2 show the GPC charts of the fluoroorganopolysiloxanes obtained in Example 1and Comparative Example 1, respectively.

In the general formula (I) of the fluoroorganopolysiloxane of the present invention, $R^1$ is a fluorine-containing organic group containing the perfluoroalkylether group having the following formula:

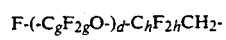

where g represents an integer of from 1 to 3, d represents an integer of from 1 to 5, and h is 1 or 2.

typically, $R^1$ has normally from 3 to 18 carbon atoms, and more typically has from 6 to 15 carbon atoms. The perfluoralkylether group having too small a number of carbon atoms may impair the properties of the present polymer, such as release properties, low surface energy, etc. The fluorine-containing organic group includes, for example, the groups having the following formulas:

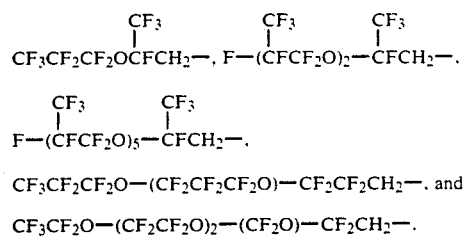

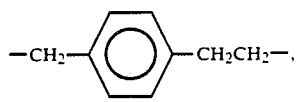

CF₃CF₂CF₂O—(CF₂CF₂CF₂O)—CF₂CF₂CH₂—, and

CF₃CF₂O—(CF₂CF₂O)₂—(CF₂O)—CF₂CH₂—.

$R^2$ is a divalent substituted or unsubstituted hydrocarbon group having from 3 to 10 carbon atoms, and it includes, for example, alkylene groups such as a trimethylene group, a propylene group, and a 2-methyltrimethylene group; and alkylene groups substituted partly by a phenylene radical, such as

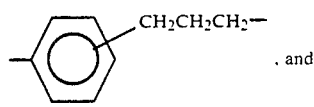

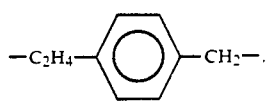

$R^3$ is a substituted or unsubstituted hydrocarbon group having from 1 to 10 carbon atoms and containing no fluorine atom. It includes, for example, alkyl groups such as a methyl group, an ethyl group, and a propyl group; aliphatic unsaturated hydrocarbon groups such as a vinyl group, an allyl group, and hexenyl group; aromatic hydrocarbon groups such as a phenyl group, a tolyl group, and a xylyl group; and corresponding substituted hydrocarbon groups having a substituent such as a halogen atom, cyano group, alkoxyl group, acryloyloxy group, methacryloyloxy group, and silyl group, including, e.g., a chloroethyl group, chloropropyl group, cyanoethyl group, and methoxyethyl group, —C₃H₆OCO—C(—R⁶)=CH₂, —C₂H₄Si(OR⁷)₃, —C₂H₄Si(OR⁷)₃, —CH₂CH(—R⁶)—COOC₃H₆Si(OR⁷)₃,

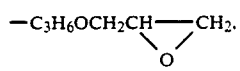

wherein $R^7$ is a C₁ to C₅ alkyl group, or a C₂ to C₅ alkoxyalkyl group or alkenyl group, and $R^6$ is a hydrogen atom or a methyl group.

The symbol a is a number of from 0.001 to 0.34, b is a number of from 1.64 to 2.34, c is a number of from 0 to 0.67, and a+b+c ranges from 1.90 to 2.67.

There is no limitation on the amount of the aliphatic unsaturated hydrocarbon groups contained as an $R^3$ in the molecule of the fluoroorganopolysiloxane of the present invention. In the case the fluoroorganopolysiloxane of the present invention is used as an ingredient of a fluorosilicone rubber, the amount of the aliphatic unsaturated groups is suitably adjusted according purposes, and normally ranges from 0.2 to 30 mol % of all the pendant groups bonded to silicon atoms. In the case it is used as a silicone gel, it may contain less than two aliphatic unsaturated groups on average in the molecule, because it is required that the molar ratio of silicon-bonded hydrogen atoms of an organohydrogenpolysiloxane used in combination to the silicon-bonded aliphatic unsaturated groups in the fluoroorganopolysiloxane of the invention ranges from 1 to 1.5.

Typical examples of the fluoroorganopolysiloxane represented by the above general formula (I) of the present invention include, for example, a compound having the following general formula (II):

wherein $R^1$, $R^2$ and $R^3$ are as defined above,
$R^4$ has the same meaning as $R^3$ or represents a hydrogen atom or a group having the formula:

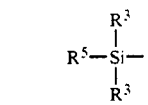

where $R^3$ is as defined above,
$R^5$ has the same meaning as $R^3$ or represents a group having the formula: —R²OR¹ where $R^1$ and $R^2$ are as defined above,
m is an integer of at least 2, n is an integer of not less than 1, provided m≧2n,
and having a vinyl group at the both ends and/or a side chain. The fluoroorganopolysiloxane of the general formula (II) includes, as a typical example, the ones represented by the general formula (II) wherein $R^4$ at the both ends of the molecule is a triorganosilyl group, for example, the compounds of the following formulas:

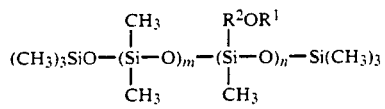

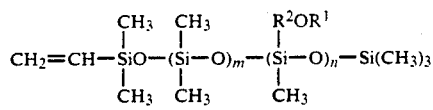

wherein $R^1$, $R^2$, m and n are as defined above; and the ones represented by the general formula (II) wherein m+n ranges from 3 to 2,000, and the ends of the molecule are terminated by a silanol group.

Moreover, the fluoroorganopolysiloxane of the present invention has a viscosity of not less than 1×10⁶ cP at 25° C. No fluoroorganopolysiloxane with such a large polymerization degree is known, heretofore.

Preparation process

The preparation of the fluoroorganopolysiloxane of the present invention can be carried out by a process comprising the step of polymerizing a fluorine-containing cyclotrisiloxane having the following formula (III):

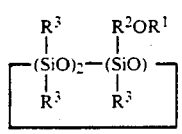

wherein $R^1$, $R^2$ and $R^3$ are as defined above, or a mixture of said fluorine-containing cyclosiloxane of the formula (III) and a cyclosiloxane having the following formula (IV):

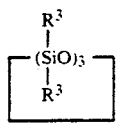

wherein $R^3$ is as defined above, in the presence of at least one basic catalyst selected from the group consisting of quaternary phosphonium hydroxide, quaternary ammonium hydroxide and corresponding silanolates thereof, or an acidic catalyst and substantially in the absence of water at a temperature of not higher than 80° C.

Starting materials

In the formulas (III) and (IV), $R^1$, $R^2$ and $R^3$ are as defined in respect of said formula (I). The fluorine-containing cyclotrisiloxane of the formula (III) includes, for example, the compounds represented by the following formulas:

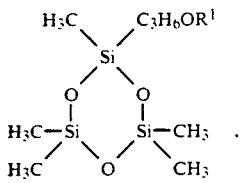

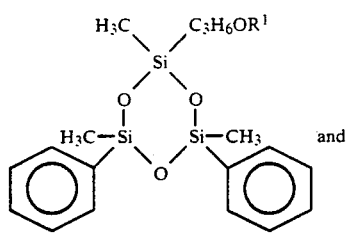

and

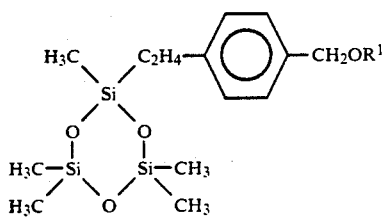

wherein $R^1$ is as defined above. The cyclotrisiloxane of the formula (IV) includes, for example, the compounds represented by the following formulas:

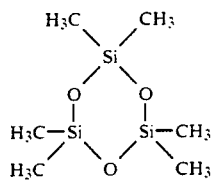

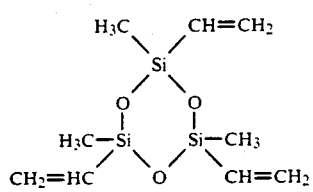

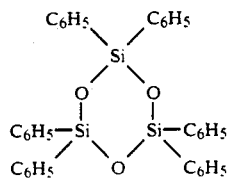

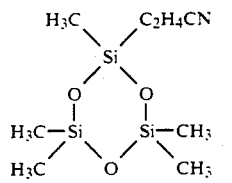

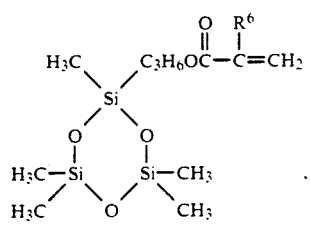

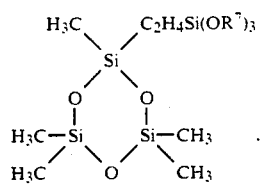

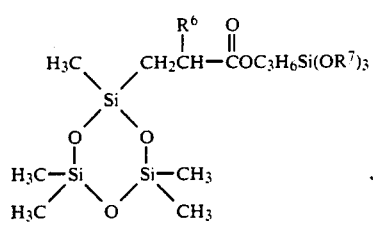

, and

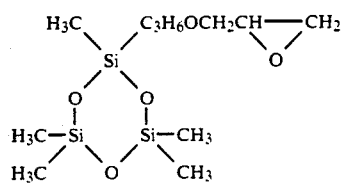

wherein $R^6$ and $R^7$ are as defined above.

In the case where a mixture of the fluorine-containing cyclotrisiloxane of said formula (III) and the cyclotrisiloxane of the formula (IV) is used in the preparation of the fluoroorganopolysiloxane of the present invention, the mixing ratio of the fluorine-containing cyclotrisiloxane of said formula (III) to the cyclotrisiloxane of said formula (IV) is decided suitably according to an intended fluoroorganopolysiloxane of the formula (I), and it normally ranges from 99.9/0.1 to 0.1/99.9, by weight.

The fluorine-containing cyclotrisiloxane of the above formula (III) can be prepared, for example, by the process using a perfluoroalkylene oxide, exemplified below, as a starting material.

First, as shown in the equation (a) below, a perfluoroalkylene oxide having the formula (V) is polymerized in the presence of a catalyst in a non-protonic polar solvent to produce an acid fluoride having the formula (VI). (See H. S. Eleuterio, J. Macromol Sci-Chem., A6(6), 1027 (1979); U.S. Pat. No. 3,250,808; and Japanese preexamination patent publication (KOKAI) No. 195345/1987).

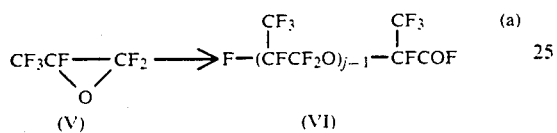

wherein j is an integer of from 2 to 6.

The non-protonic solvent used in this reaction includes, for example, tetraglyme. The catalyst includes, for example, cesium fluoride CsF, potassium fluoride, and the like.

Subsequently, the acid fluoride of the formula (VI) obtained is reduced with a reducing agent such as, e.g., LiAlH$_4$ and NaBH$_4$, followed by hydrolysis to produce a perfluoroalkyl polyether alcohol represented by the following formula (VII):

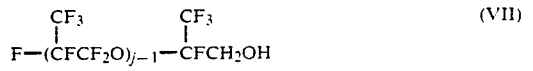

(See U.S. Pat. No. 3,293,306).

The perfluoroalkylpolyetheralcohol of the formula (VII) is reacted with a halogenated alkene, e.g., allyl bromide to produce, for example, an ether compound having a vinyl group at its end represented by the following formula (VIII):

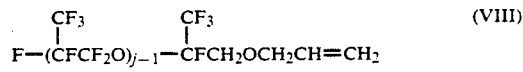

(see the specification of Japanese Patent Publication (KOKOKU) No. 253044/1988). In order to allow this reaction to proceed smoothly, for example, a basic substance such as sodium hydroxide, or a phase-transfer catalyst such as tetrabutyl ammonium-hydrogen-sulfuric acid may be used.

The ether compound of the formula (VIII) and methyldichlorosilane are subjected to addition reaction in the presence of a platinum catalyst according to the following equation (b) to produce a silane compound of the formula (IX). (See the specification of Japanese Patent Publication (KOKOKU) No. 255288/1988).

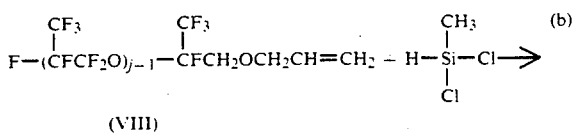

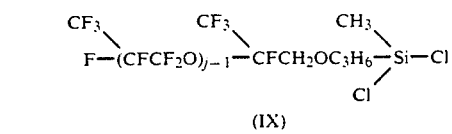

Subsequently, the silane compound of the formula (IX) and tetramethyldisiloxane diol are subjected to dehydrochlorination to produce a fluorine-containing cyclotrisiloxane having the formula (IIIa):

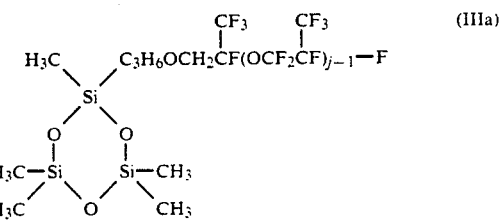

(See the specification of Japanese Patent Application No.71887/1989). The dehydrochlorination agent which may be used includes, for example, tertiary amines such as triethylamine and active hydrogen-free cyclic amines such as pyridine.

In the foregoing description, the preparation of the fluorine-containing cyclotrisiloxane of the formula (III) are described based on a particular example. However, selection of a starting material corresponding to an intended fluorine-containing cyclotrisiloxane of the formula (III) makes it possible to produce a variety of fluorine-containing cyclotrisiloxanes of the formula (III). Particularly, change of the starting perfluoroalkylene oxide and the preparation process can provide an acid fluoride having a structure differing from that of the above formula (VI). (see Japanese Patent Publication No. 11164/1971). From the acid fluorides with a different structure, fluoroorganopolysiloxanes various perfluoroalkylether groups can be prepared. In the case of the preparation process described above, use of a mixed starting material containing various perfluoroalkylene oxides can bring about a mixture of various fluorine-containing cyclotrisiloxanes having different perfluoroalkylether groups.

Reaction conditions

The fluorine-containing cyclotrisiloxane of the formula (III) obtained as described above, or a mixture of it with the cyclotrisiloxane of the formula (IV) is polymerized in the presence of the particular basic catalyst described above or an acidic catalyst and substantially in the absence of water to produce the fluoroorganopolysiloxane of the present invention.

The particular basic catalyst used comprise at least one member selected from the group consisting of quaternary phosphonium hydroxides, quaternary ammonium hydroxides, and silanolates thereof. The quaternary phosphonium hydroxides include, for example, the compounds having the formulas:

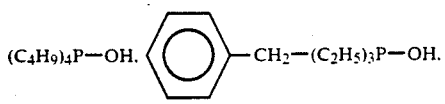

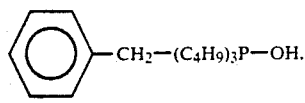

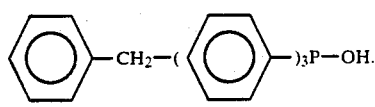

The quaternary ammonium hydroxides include, for example, the compounds having the formulas:

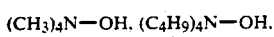

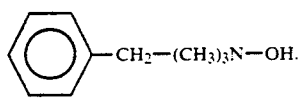

Among these basic catalysts, particularly preferred is $(C_4H_9)_4POH$, which makes it possible to produce a fluoroorganopolysiloxane containing a very small amount of readily available. Silanolation of the quaternary phosphonium hydroxide or the quaternary ammonium hydroxide can be performed, for example, by heating an aqueous solution of it with octamethycyclotetrasiloxane at from 50° to 60° C. under stirring, with water being distilled under reduced pressure.

The acidic catalyst preferably includes, for example, $ClSO_3H$, $CF_3SO_3H$, $FSO_3H$, $H_2SO_4$, and $PNCl_2$.

The amount of the catalyst is not particularly limited. Normally, the catalyst is preferably used in an amount such that the molar ratio of all the Si in the fluorine-containing cyclotrisiloxane of said formula (III) and the cyclotrisiloxane of the formula (IV) to the catalyst molecule may range from about 2,000 to 50,000. If the catalyst is present in too large an amount, it also binds to monomers, the cyclotrisiloxanes of the formulas (III) and (IV) during polymerization, to form terminal silanolate groups; hence a fluoroorganopolysiloxane with a large polymerization degree can be produced with difficulty. Moreover, neutralization treatment after the polymerization become harder, and salts formed by the neutralization may exert bad influence upon the properties of the resulting fluoroorganopolysiloxane.

Polymerization is normally carried out at 80° C. or lower. In the case an acidic catalyst is used, preferably at from $-10°$ to 60° C., and more preferably at from 0° to 30° C. In the case a basic catalyst is used, at from 10 to 80° C., and more preferably at from 20° to 60° C. At too high a temperature, formation of low molecular weight cyclic compounds may be promoted by equilibration reaction.

Polymerization time can be set to within a time of for from several minutes to several ten minutes as required. Preferably, the polymerization time is set to from 30 minutes to several hours by regulating the catalyst amount and polymerization temperature so that a fluoroorganopolysiloxane with a desired polymerization degree may be prepared.

As a solvent for polymerization, for example, nonprotic solvents such as tetrahydrofrun, dioxane, diglyme, tetraglyme, dimethylformamide, and acetonitrile, or inert solvents such as frons may be used.

Since water, alcohols or silanols incorporated into the reaction system not only reduce the rate of polymerization but also lower the polymerization degree of a resulting fluoroorganopolysiloxane. Hence, these needs to be removed from the reaction system to the utmost. Particularly, regarding water, the polymerization is carried out substantially in the absence thereof; for example, the water content of the reaction system is preferably controlled to 200 ppm or less, and more preferably to 100 ppm or less. Moreover, it is preferable to enhance the purity of all the materials used in the reaction system, e.g., the fluorine-containing cyclotrisiloxane of the formula (III), the cyclotrisiloxane of the formula (IV) and the catalyst. In this regard, the fluorine-containing cyclosiloxane of the formula (IV) and the cyclosiloxane of the formula (IV) preferably have a purity of 98% or more, and more preferably 99% or more.

Neutralization treatment

In the case silica or the like is blended with a fluoroorganopolysiloxane with a large polymerization degree, the polysiloxane may be automatically neutralized with hydrochloric acid contained in the silica in a small amount; hence neutralization is not required. However, in general, a reaction mixture resulting from polymerization as described above normally contains a residual basic catalyst or acidic catalyst, it is preferably neutralized, thereby the fluoroorganopolysiloxane being stabilized.

The neutralization treatment can make the polymer either terminated with a triorganosilyl group or terminated with a silanol group, selectively, by selecting a neutralizing agent suitably.

First, in the case where the polymerization has been carried out using a basic catalyst, in order to obtain a fluoroorganopolysiloxane terminated with a triorganosilyl group, for example, the reaction mixture is neutralized with a halosilane compound having the formula (X):

$$R^5(R^3)_2SiX \qquad (X)$$

wherein $R^3$ and $R^5$ are as defined above, and X represents a halogen atom, and a disilazane compound having the formula (XI):

$$[R^5(R^3)_2Si]_2NH \qquad (XI)$$

wherein $R^3$ and $R^5$ are as defined above, in combination, thereby the fluoroorganopolysiloxane is stabilized.

The halosilane of said formula (X) used in the neutralization, which serves as a neutralizing agent, includes, for example, trialkylhalosilanes represented by the formulas:

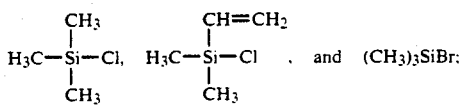

halosilanes having a vinyl group, phenyl group, etc. such as $CH_2=CH(CH_3)_2SiI$, $(CH_2=CH)_3SiCl$, and $CH_2=CHSi(C_6H_5)(CH_3)Cl$.

The disilazane compound of said formula (XI) serves to capture hydrochloric acid which may be by-produced by hydrolysis of said halosilane compound and thereby to control depolymerization. It includes, for example, hexacarbyldisilazanes such as the compounds represented by the formulas:

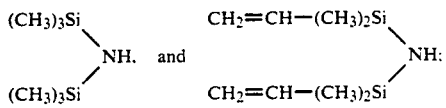

and silazanes having a fluorine-containing organic group, such as the compounds represented by the formulas:

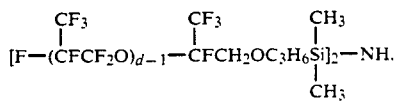

wherein d is as defined above.

The halosilane compound is normally used in an amount such that the molar ratio of it to the catalyst used for polymerization may range from about 0.8 to about 3.0. The disilazane compound is normally used in an amount such that the molar ratio of it to the catalyst used for the polymerization may range from about 0.5 to about 10. The use of the halosilane compound or the disilazane compound in too large an amount may make the resulting fluoroorganopolysiloxane unstable.

Where the fluoroorganopolysiloxane is made terminated with a triorganosilyl group by the method of neutralizing by combined use of the halosilane compound and the disilazane as described above, a vinyl group or other functional group can be introduced as a part of the organic groups possessed by the terminal triorganosilyl group.

Where the polymerization has been carried out using an basic catalyst, in order to prepare a fluoroorganopolysiloxane terminated with a silanol group, preferably, the basic catalyst is neutralized with an acidic substance such as dilute hydrochloric acid, dilute sulfuric acid, and phosphoric acid, and then salts formed and an excess acidic substance are removed. Normally, the acidic substance is preferably used in an amount 0.8 to 3 times by equivalent weight that of the basic catalyst used.

Where the polymerization has been carried out using an acidic catalyst, preferably, a solution of a basic substance such as an aqueous ammonia and an aqueous amine compound solution is used as a neutralizing agent, and then formed salts and excess basic substance are removed. Amine compounds to be used are preferably ones which can be distilled away, including , for example, lower alkylamines such as dimethylamine, propylamine, and ammonium carbonate. In this case, normally, the basic substance for neutralization is preferably used in an amount such that the nitrogen atoms contained in the basic substance is from 1 to 5 times by equivalent weight the acidic catalyst used.

Other conditions

In the preparation of the fluoroorganopolysiloxane of the present invention, in order to make easier the stirring during polymerization, neutralization, the dissolving or dispersing of a neutralizing agent, or removal by filtration of the salts formed by neutralization, an inert solvent may be used as appropriate. Such inert solvents include, for example, fluorine solvents such as fron 113, and m-xylene hexafluoride, chlorine solvents such as methylene chloride and trichloroethane.

Uses

The fluoroorganopolysiloxane of the present invention has a low surface tension and refractive index, and is excellent in properties such as cold resistance and oil resistance. Hence, it is expected to be also used for release agents, fiber modifiers, liquid rubbers, and heat-cure rubbers.

EXAMPLES

The present invention will be described in detail by way of working examples and comparative examples bellow. In the description below, the fluorine-containing cyclotrisiloxane having the formula (IIIb):

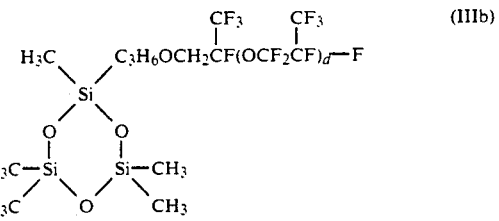

which is an example of the fluorine-containing cyclotrisiloxane of said formula (III) is abbreviated to $D_2^d$, where d is as defined above, i,e., an integer of from 1 to 5. The viscosities are measured at 25° C.

EXAMPLE 1

In a four-necked flask with an volume of 200 ml, 28.8 g of $D_2F^1$ (purity: 99.6%) was charged and then dried by heating at 120° C. in an oil bath with stirring under a stream of dry nitrogen gas for 1 hour. Ten g of the dried $D_2F^1$ was sampled out of the flask and the water content thereof was measured to be 67 ppm. Subsequently, 18.8 g of $D_2F^1$ remaining in the flask was cooled to 45° C., and then 0.055 g of a catalyst of dimethylsilanolate containing 10% of $(C_4H_9)_4POH$ (hereinafter, referred to as "TBPH catalyst") was added thereto so that the molar ratio of Si/P in the reaction system might become 5,000. Thereafter, polymerization was initiated at 40 to 45° C. under a slow stream of nitrogen. After 20 minutes, the reaction mixture exhibited an oily state with a high viscosity. After another 1 hour, it exhibited a state of gum; hence stirring became harder. Therefore, stirring rate was reduced to about 6 to 10 rpm, and the reaction mixture was aged for 3 hours, thus producing in a colorless transparent fluoroorganopolysiloxane with a viscosity of $6.2 \times 10^6$ cP.

The fluoroorganopolysiloxane was dissolved in tetrahydrofuran in a concentration of 1% to exhibit a slightly suspended state. According to GPC analysis, as shown in FIG. 1, peak 11, due to high molecular weight compounds, comprising 98% of the whole area was measured, indicating that the fluoroorganopolysiloxane hardly contains low molecular weight compounds.

Comparative Example 1

Figure 2:
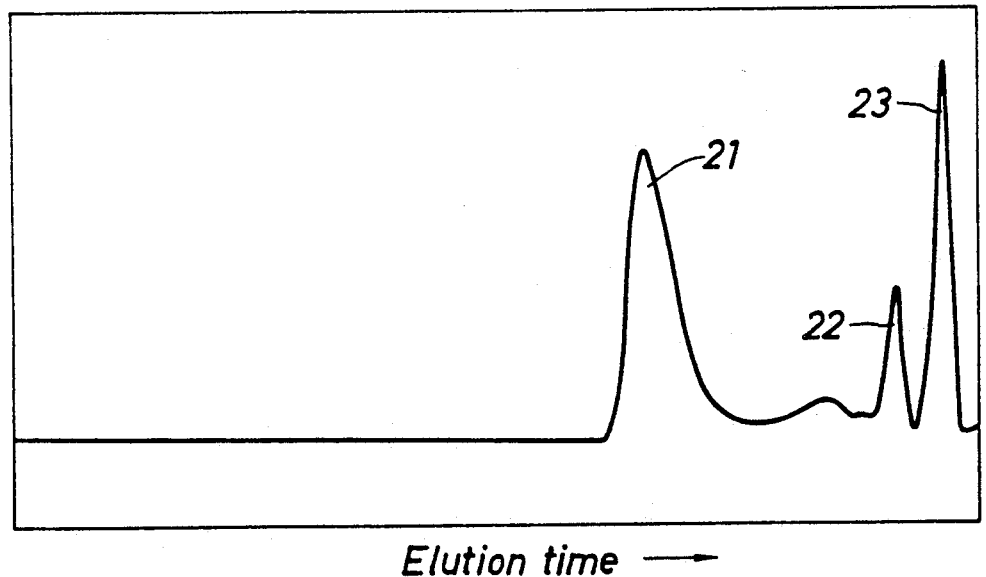

Polymerization was carried out for 16 hours in the same manner as in Example 1 except that it was done at 110° C. in place of 40°-45° C., to produce an oily fluoroorganopolysiloxane with a viscosity of 4,200 cSt at 25° C. The fluoroorganopolysiloxane obtained was analyzed by GPC in the same manner as in Example 1, to give the GPC chart as shown in FIG. 2. It shows that the area of peak 21 due to high molecular weight compounds is about 60%, and that the fluoroorganopolysiloxane obtained contain a large amount of low molecular weight compounds (peak 22 and peak 23).

Comparative Example 2

(1) After 28.2 g of $D_2F^1$ was dried in the same manner as in Example 1, a solution of 0.0090 g of a lithium silanolate catalyst represented by the following formula:

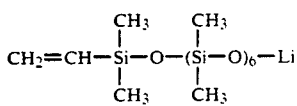

in toluene was added thereto in place of the TBPH catalyst so that the molar ratio of Si/Li in the reaction system might become 3,000. The reaction mixture was then heated at 150° to 160° C. under stirring for 8 hours. However, no increase in viscosity was observed.

(2) Only the cyclotrisiloxane having the formula (i):

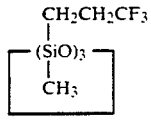

(i)

in place of $D_2F^1$ was polymerized using the lithium silanolate in the same manner as above. Analysis by GPC showed that a gum-like organopolysiloxane hardly containing low molecular weight compounds was prepared. This result shows that the cyclotrisiloxane $D_2F^1$ can be polymerized with much difficulty as compared with the cyclotrisiloxane of the formula (i).

Comparative Example 3

Polymerization was carried out in the same manner as in Comparative Example 2 except that 0.02 g of the lithium silonate was added so that the molar rates of Si/Li in the reaction system might become 1,250. However, an organopolysiloxane with a low viscosity of 149 cSt only was obtained.

Comparative Example 4

Polymerization was carried out in the same manner as in comparative Example 2, except that the lithium silanolate catalyst was replaced by a catalyst consisting of a solution prepared by dissolving 0.034 g of the compound represented by the formula:

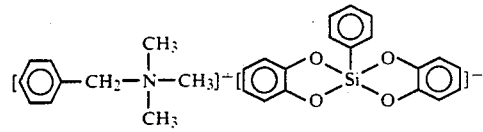

in acetonitrile in a concentration of 0.2 %, followed by reaction at 100° C. under stirring for 17 hours. No tendency of polymerization or increase in viscosity was observed.

Example 2

In a 200ml four-necked flask, 18.8 g of $D_2F^1$ was charged and dried in the same manner as in Example 1, and then heated to a temperature of 45° to 50° C. Thereafter, 0.0364 g of a catalyst consisting of a dimethyl silanolate of tetramethylammonium hydroxide (tetramethylammonium hydroxide content: 5 % by weight) was added in the flask so that the molar ratio of Si/N in the reaction system might become 5,000. Then, polymerization was carried out at 40° to 45° C. with gentle stirring for about 16 hours, to give a gum-like fluoroorganopolysiloxane.

The fluoroorganopolysiloxane obtained had a viscosity of $2.7 \times 10^6$ cP.

Example 3

A four-necked flask was charged with a mixture containing 13% by weight of the cyclosiloxane having the formula given below wherein n is 1, 49 % by weight of that wherein n is 2, 27% by weight of that wherein n is 3, 7% by weight of that wherein n is 4, and 2% by weight of that wherein n is 5 (purity: all 99.6%):

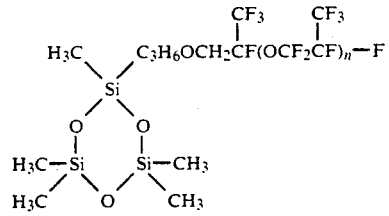

The mixture was dried at 120° C. under nitrogen stream for 1 hour. After the mixture was cooled to 30° C., 0.16 g of m-xylene hexafluoride containing 5% by weight of $CF_3SO_3H$ was added thereto so that the molar ratio of $Si/CF_3SO_3H$ in the reaction system might become 1,100. Then, polymerization was carried out at 30° C. under stirring for 16 hours to produce a reaction mixture containing a transparent gumlike fluoroorganopolysiloxane. To the reaction mixture, 0.48 g of dioxane containing 1 % by weight of water was added and the resulting mixture was stirred for 60 minutes. Then, 0.495 g of a solution containing 10% 1,3-divinyl-1,1,3,3-tetramethyldisilazane in xylene was added, followed by mixing under stirring, and neutralization was thereby effected.

The fluoroorganopolysiloxane had a viscosity of $1 \times 10^6$ cP, and was insoluble in tetrahydrofuran.

Example 4

In a flask was charged 113.7 g of $D_2F^1$ (purity: 98.9 %), which was then dewatered at 30° to 35° C. under a nitrogen stream for 10 hours. Then, 10 g of the $D_2F^1$ thus dried was sampled, and the water content thereof was measured to be 186 ppm. In the flask, 0.14 g of tetravinyltetramethylcyclotetrasilaxane and 0.142 g of in the reaction system might become $1 \times 10^4$, followed by polymerization at 30° to 35° C. About 5 minutes after the initiation of the polymerization, increase in viscosity of the reaction mixture was observed. When the reaction mixture became highly viscous, the stirring rate was slowed down to 6–10 rpm and the reaction mixture was then aged for about 20 hours, and a fluoroorganopolysiloxane was thereby obtained. The polymer obtained was colorless and transparent, and had a viscosity of $4.1 \times 10^6$ cP.

Neutralization test

The fluoroorganopolysiloxane was divided into 10 g portions, which were each put in a glass bottle with an about 30 ml volume. In each bottle, a neutralizing agent given in Table 1 was added and mixed. The mixture was left to stand at room temperature for 6 hours, and then aged at 150° C. for 22 hours, followed by measurement of non-volatile content and viscosity. The measurement of viscosity was conducted on 10 weight % solution of the fluoroorganopolysiloxane dissolved in m-xylene hexafluoride. Incidentally, the corresponding solution before the aging treatment had a viscosity of 25.2 cSt. The results are given in Table 1.

TABLE 1

| Neutralization test | Neutralizing agent | Molar ratio relative to TBPH | Non-volatile content, % | Viscosity after ageing, cST *1 |
|---|---|---|---|---|
| 1 | CH$_3$COOH | 2.0 | 96.1 | 7.1 |
| 2 | (CH$_3$)$_3$SiCl | 2.0 | 96.3 | 15.1 |
| 3 | ClCH$_2$CHOH | 2.0 | 96.3 | 6.7 |
| 4 | (CH$_3$)$_3$SiCl/ [(CH$_3$)$_3$Si]$_2$NH (Ratio: 1/9 by weight) | 1.0 *3 | 96.3 | 24.9 |
| 5 | (CH$_3$)$_3$SiCl/ [(CH$_3$)$_3$Si]$_2$NH (Ratio: 1/9 by weight) | 1.5 *3 | 96.4 | 24.9 |
| 6 | (CH$_3$)$_3$SiCl/ [(CH$_3$)$_3$Si]$_2$NH (Ratio: 1/9 by weight) | 2.0 *3 | 96.4 | 23.2 |
| 7 | Silyl phosphate *2 | 1.0 | — | 11.6 |
| 8 | " | 2.0 | — | 14.8 |
| 9 | None | — | — | 6.9 |

Remarks:
*1: dissolved in m-xylene hexafluoride in the concentration of 10%, and measured at 25° C.
*2: PO$_4$ content: 33%
*3: Molar ratio of (CH$_3$)$_3$SiCl/TBPH catalyst Further, the fluoroorganopolysiloxane after neutralization and aging in the neutralization test No. 4 was subjected to measurements of IR absorption spectrum and $^1$H-NMR spectrum, and GPC analysis. The results obtained are as shown below.

IR absorption spectrum

Figure 3:
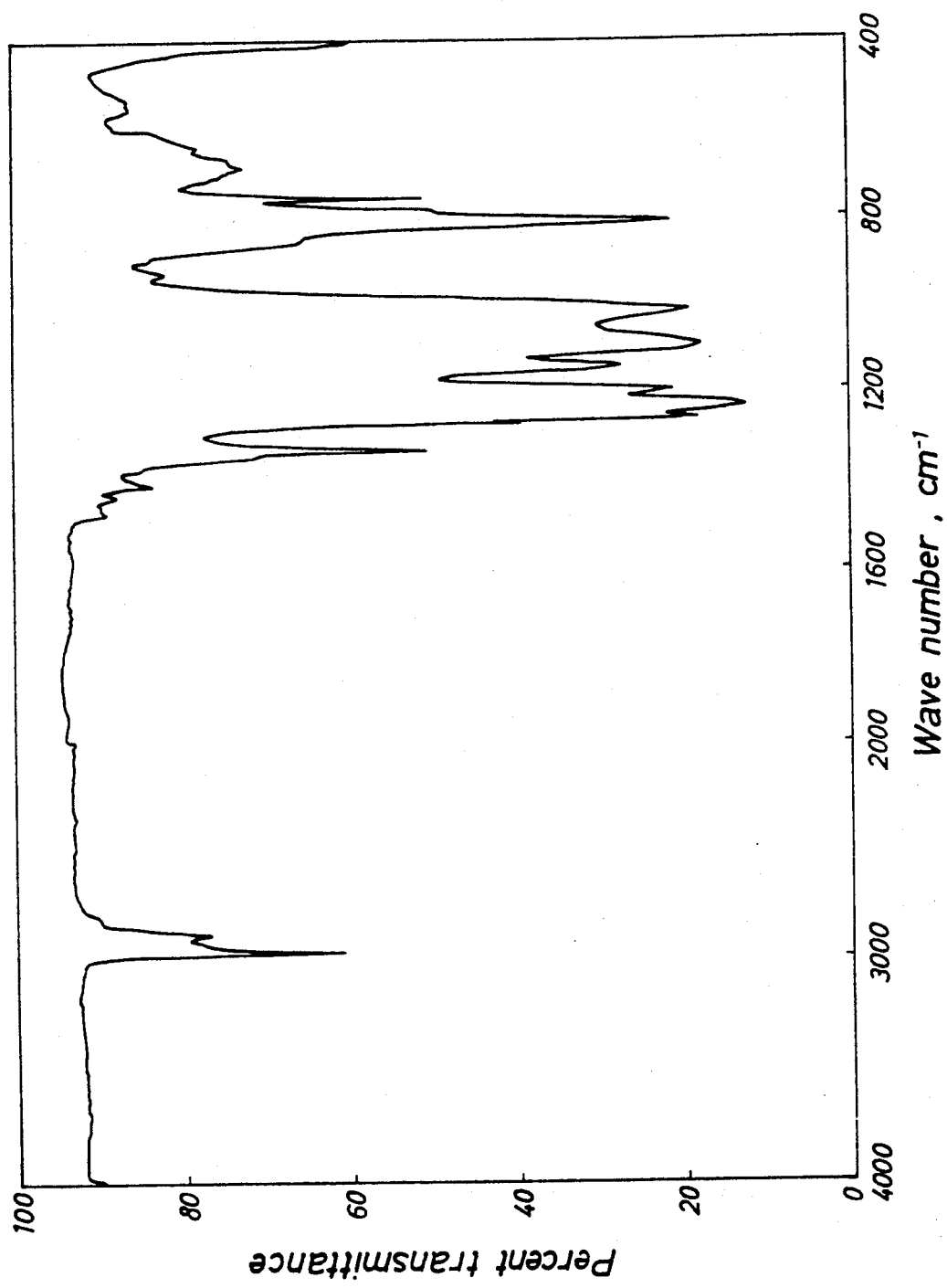
FIGS. 3 to 5 show the IR absorption spectrum, $^1$H-NMR spectrum and GPC chart, respectively, of the fluoroorganopolysiloxane obtained in Example 4.

The spectrum is as shown in FIG. 3. Main characteristic absorption bands are as follows.

1,000 to 1,130 cm$^{-1}$ (Si-O-Si)
2,970, 1,260, 810 cm$^{-1}$ (Si-CH$_3$)
1,000 to 1,400 cm$^{-1}$ (C-F)

Figure 4:
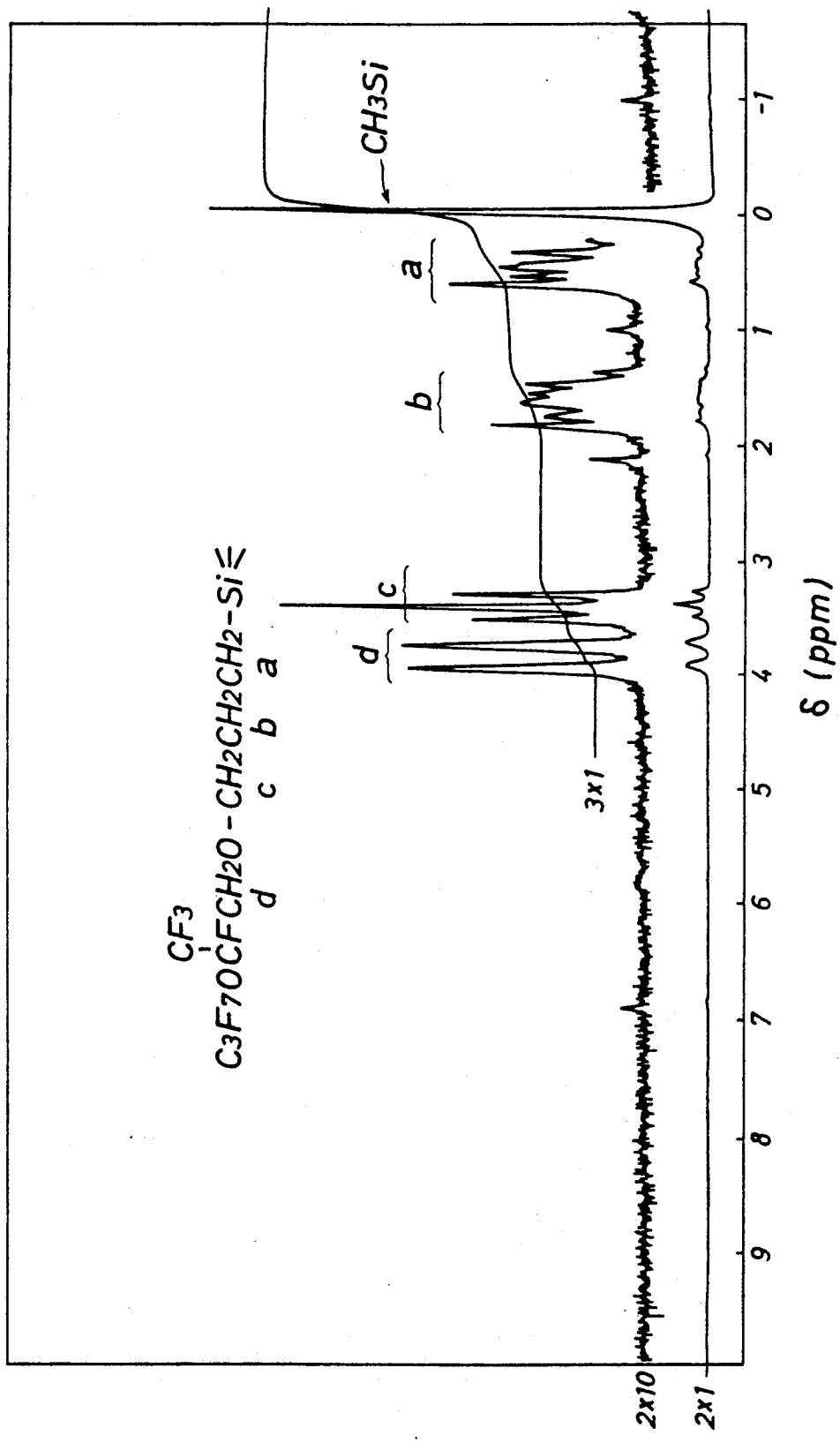

$^1$H-NMR: freon 113 solution
The result shown in FIG. 4 was obtained. Main absorptions are assigned as follows.
δ:

3.70–4.08 ppm (d, $$-\overset{|}{C}FCH_2O-,$$

2H)
2.28–3.40 ppm (t, —OC$\underline{H}_2$—, 2H)
1.34–1.91 ppm (m, —C$\underline{H}_2$CH$_2$C$\underline{H}_2$—, 2H)
0.30–0.70 ppm (m, —C$\underline{H}_2$Si, 2H)

GPC analysis

Figure 5:
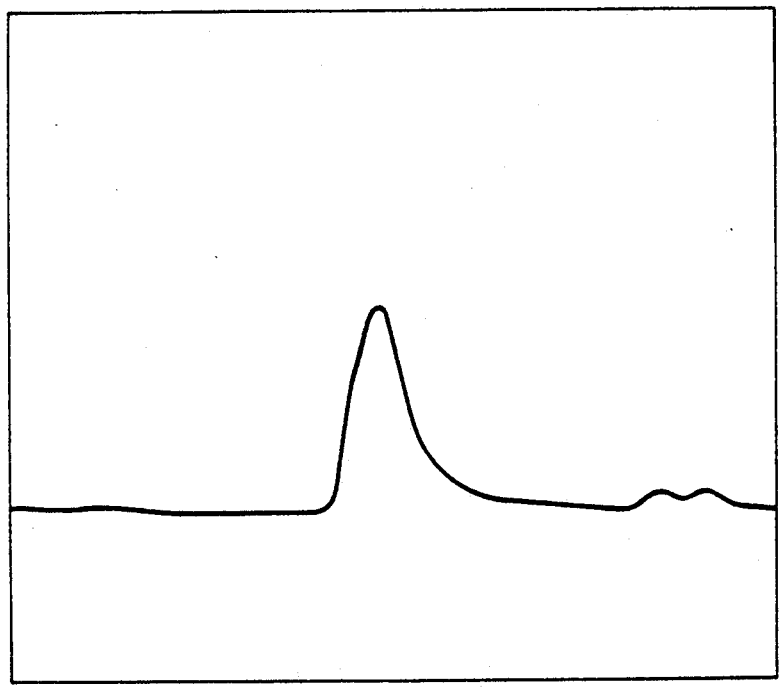

The polymer was dissolved in THF in a concentration of 1% by weight to form a slightly turbid solution. The results of GPC analysis, as given in FIG. 5, shows that the area of the peak due to low molecular weight compounds accounts for about 8% of the whole area, indicating that the content of the low molecular weight compounds is small.

The refractive index, specific gravity, solidification point and vinyl content were measured to be 1.3656, 1.29, −98° C. and 0.0017 mol/100 g, respectively.

The results above show that even in the case polymerization was carried out using TBPH catalyst, without sufficient neutralization after polymerization, the fluoroorganopolysiloxane obtained is not stable. It also show that in the case (CH$_3$)$_3$SiCl and [(CH$_3$)$_3$Si]$_2$NH are used in combination as a neutralizing agent, neutralization can be achieved sufficiently if the amount thereof changes to some degree.

EXAMPLE 5

In the same manner as in Example 1, 29.9 g of D$_2$F$^2$ (purity: 99.4%; Si atoms: ca. 0.12 mol) was charged in a flask, and dried. Then, 0.110 g of TBPH catalyst was added thereto at 30° to 35° C. so that the molar ratio of Si/P in the reaction system might become 3,000, and thereafter polymerization was carried out at 30° to 35° C. for about 16 hours. The fluoroorganopolysiloxane obtained was in a gum-like state and had a viscosity of $5.6 \times 10^6$ cP. The specific gravity, and refractive index (n$_D^{25}$) were measured to be 1.36 and 1.3530, respectively.

EXAMPLE 6

In a four-necked flask, 18.8 g of D$_2$F$^1$ was charged and dried by passing a dry nitrogen gas therethrough. Then, a solution containing 18.8 mg of trifluoromethanesulfonic acid (CF$_3$SO$_3$H) in a concentration of 1% in m-xylene hexafluoride was added at 0° C., and polymerization was carried out at 0° C. under stirring. About 18 hours later, a fluoroorganopolysiloxane in a gum-like state was obtained, and the viscosity thereof was measured to be $5.6 \times 10^6$ cP. This fluoroorganopolysiloxane was analyzed by GPC to find that it contained about 30% of low molecular weight compounds.

EXAMPLE 7

In a four-necked flask, 14.6 g of D$_2$F$^2$ and 2.2 g of hexamethylcyclotrisiloxane were charged, and dried at 70° C. for 1 hour. After the mixture was cooled to 40° C., 0.083 g of TBPH catalyst was added thereto so that the , molar ratio of Si/P in the reaction mixture might become 3,000. Polymerization was then carried out at 40° C. under stirring for 6 hours to produce a transparent gum-like fluoroorganopolysiloxane. Thereafter, in the same manner as in the neutralization test No. 5 of Example 5, a mixed neutralizing agent consisting of

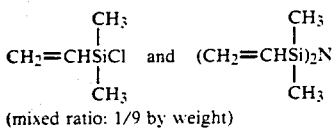

(mixed ratio: 1/9 by weight)

was added so that the molar ratio of CH$_2$=CHSi(CH$_3$)$_2$Cl/the catalyst might become 1.2, and neutralization was then carried out at 40° C. under stirring for 2 hours.

The viscosity of the fluoroorganopolysiloxane obtained was measured to be 2.1×10$^6$ cP. The fluoroorganopolysiloxane was dissolved in m-xylene hexafluoride in a concentration of 1% to form a solution, which was subjected to GPC analysis. The result showed that the fluoroorganopolysiloxane hardly contained low molecular weight compounds.

We claim:

1. A fluoroorganopolysiloxane having the following general unit formula (I):

$$(R^1OR^2)_a(R^3)_b(OH)_c(SiO)_{\frac{4-a-b-c}{2}} \quad (I)$$

wherein
R$^1$ represents a fluorine-containing organic group represented by the following formula:

F-(-C$_g$F$_{2g}$O-)$_d$-C$_h$F$_{2h}$CH$_2$- where d represents an integer of from 1 to 5, g represents an integer of from 1 to 3, and h is an integer of 1 or 2,
R$^2$ represents a divalent substituted or unsubstituted hydrocarbon group having 3 to 10 carbon atoms and containing no fluorine atom, R$^3$ represents a substituted or unsubstituted hydrocarbon group containing 1 to 10 carbon atoms and containing no fluorine atom,
a is a number of from 0.001 to 0.34
b is a number of from 1.64 to 2.34
c is a number of from 0 to 0.67, and a+b+c ranges from 1.90 to 2.67,
and having a viscosity of not less than 1×10$^6$ at 25° C.

2. A process for preparing the fluoroorganopolysiloxane claimed in claim 1, comprising the step of polymerizing a fluorine-containing cyclotrisiloxane having the following formula (III):

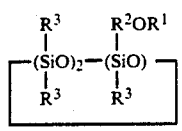

wherein R$^1$ represents a fluorine-containing organic group represented by the following formula:

F-(-C$_g$F$_{2g}$O-)$_d$-C$_h$F$_{2h}$CH$_2$- where d represents an integer of from 1 to 5, g represents an integer of from 1 to 3, and h is an integer of 1 or 2, R$^2$ represents a divalent substituted or unsubstituted hydrocarbon group having 3 to 10 carbon atoms and containing no fluorine atoms, R$^3$ represents a substituted or unsubstituted hydrocarbon group containing 1 to 10 carbon atoms and containing no fluorine atoms, or a mixture of said fluorine-containing cyclosiloxane of the formula (III) and a cyclosiloxane having the formula (IV):

wherein R$^3$ is as defined above, in the presence of an acidic catalyst or at least one basic catalyst selected from the group consisting of a quaternary phosphonium hydroxide, a quaternary ammonium hydroxide, a quaternary phosphonium silanolate and a quaternary ammonium silanolate, substantially in the absence of water, at a temperature of not higher than 80° C.

3. The process of claim 2, wherein said polymerization is carried out in the presence of a basic catalyst selected from the group consisting of a quarternary phosphonium hydroxide, a quaternary ammonium hydroxide, a quaternary phosphonium silanolate and a quaternary ammonium silanolate, at a temperature of from 10° to 80°) C.

4. The process of claim 3, wherein the reaction mixture obtained by the polymerization is neutralized with a mixture of:

(A) a halosilane compound having the formula (X):

R$^5$(R$^3$)$_2$SiX  (X)

wherein R$^3$ represents a substituted or unsubstituted hydrocarbon group containing 1 to 10 carbon atoms and containing no fluorine atom, R$^5$ represents a substituted or unsubstituted hydrocarbon group containing 1 to 10 carbon atoms containing no fluorine atoms or is a fluorine-containing organic group represented by the formula R$^2$OR$^1$, wherein R$^1$ represents a fluorine-containing organic group represented by the following formula:

F-(C$_g$F$_{2g}$O-)$_d$-C$_h$F$_{2h}$CH$_2$- where d represents an integer of from 1 to 5, g represents an integer of from 1 to 3, and h is an integer of 1 or 2, R$^2$ represents a divalent substituted or unsubstituted hydrocarbon group having 3 to 10 carbon atoms and containing no fluorine atoms, and X represents a halogen atom, and (B) a disilazane compound having the formula (XI):

(R$^5$(R$^3$)$_2$Si)$_2$NH  (XI)

R$^3$ and R$^5$ are as defined above, thereby terminating said fluoroorganopolysiloxane with a group having the formula:

R$^5$(R$^3$)$_2$Si-

R$^3$ and R$^5$ are as defined above.

5. The process of claim 4, wherein said halosilane compound of the formula (X) is used in an amount such that the molar ratio of it to the catalyst used ranges from 0.8 to 3.0.

6. The process of claim 4 wherein said disilazane compound of the formula (XI) is used in an amount such that the molar ratio of it to the catalyst used ranges from 0.5 to 10.

7. The process of claim 3, wherein the reaction mixture obtained by the polymerization is neutralized with an acidic substance, thereby said fluoroorganopolysiloxane is terminated by a silanol group.

8. The process of claim 2, wherein said polymerization is carried out in the presence of an acidic catalyst at $-10°$ to $60°$ C.

9. The process of claim 8, wherein the reaction mixture obtained by the polymerization is neutralized with a basic substance.

10. The fluoroorganopolysiloxane of claim 1, represented by the general formula (II):

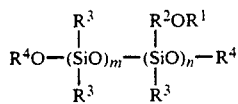
(II)

wherein $R^1$ represents a fluorine-containing organic group represented by the following formula:

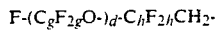

where d represents an integer of from 1 to 5, g represents an integer of from 1 to 3, and h is an integer of 1 or 2, $R^2$ represents a divalent substituted or unsubstituted hydrocarbon group having 3 to 10 carbon atoms and containing no fluorine atoms, $R^3$ represents a substituted or unsubstituted hydrocarbon group containing 1 to 10 carbon atoms and containing no fluorine atoms, $R^4$ has the same meaning as $R^3$ or represents a hydrogen atom or a group having the formula:

where $R^3$ is as defined above and $R^5$ has the same meaning as $R^3$ or is $-R^2OR^1$, where $R^1$ and $R^2$ are as defined above, m is an integer of at least 2, and n is an integer of not less than 1, provided $m \geq 2n$.

11. The fluoroorganopolysiloxane of claim 10, wherein $R^4$ is a group having the formula:

wherein m is an integer of from 20 to 5,000, and n is an integer of from 10 to 2,500.

12. The fluoroorganopolysiloxane of claim 10, wherein at least one of the groups represented by $R^3$, $R^4$ and $R^5$ is a vinyl group.

13. The fluoroorganopolysiloxane of claim 10, wherein in the general formula (II), $R^4$ is a hydrogen atom, and $m+n$ is a integer of from 3 to 3,000.

* * * * *